(12) United States Patent
Shih et al.

(10) Patent No.: US 8,059,244 B2
(45) Date of Patent: Nov. 15, 2011

(54) LIQUID CRYSTAL DISPLAY WITH HIGH APERTURE RATIO

(75) Inventors: Po-Sheng Shih, Tao-Yuan Hsien (TW); Tsu-Chiang Chang, Tao-Yuan Hsien (TW); Po-Yang Chen, Tao-Yuan Hsien (TW); Chao-Hui Wu, Tao-Yuan Hsien (TW)

(73) Assignee: HannStar Display Corp., Wugu Industrial Zone, Taipei County (TW)

( * ) Notice: Subject to any disclaimer, the term of this patent is extended or adjusted under 35 U.S.C. 154(b) by 658 days.

(21) Appl. No.: 12/193,755

(22) Filed: Aug. 19, 2008

(65) Prior Publication Data

US 2009/0141228 A1 Jun. 4, 2009

(30) Foreign Application Priority Data

Nov. 30, 2007 (TW) ................................ 96145747 A

(51) Int. Cl.
*G02F 1/1343* (2006.01)
*G02F 1/136* (2006.01)

(52) U.S. Cl. ............... 349/139; 349/38; 349/39; 349/42

(58) Field of Classification Search ................... 349/38, 349/39, 42, 139
See application file for complete search history.

(56) References Cited

U.S. PATENT DOCUMENTS

| 4,955,697 | A | * | 9/1990 | Tsukada et al. | 349/38 |
| 6,046,063 | A | * | 4/2000 | Jun et al. | 438/30 |
| 6,724,453 | B2 | * | 4/2004 | Cho | 349/139 |
| 7,223,621 | B2 | * | 5/2007 | Kim | 438/30 |
| 2002/0085134 | A1 | * | 7/2002 | Chung | 349/39 |
| 2003/0007107 | A1 | * | 1/2003 | Chae et al. | 349/43 |
| 2010/0008549 | A1 | * | 1/2010 | Jessen et al. | 382/118 |

FOREIGN PATENT DOCUMENTS

TW 583482 4/2004

* cited by examiner

*Primary Examiner* — Huyen Ngo

(74) *Attorney, Agent, or Firm* — Winston Hsu; Scott Margo

(57) ABSTRACT

A thin film transistor liquid crystal display includes a substrate, a first conductive line disposed on the substrate, an inorganic insulating layer covering the substrate, a transparent electrode attached to the inorganic insulating layer, a second conductive line crossing the first conductive line, an inorganic passivation layer covering the substrate and a pixel electrode attached to the inorganic passivation layer and overlapping the transparent electrode and a part of the first conductive line.

12 Claims, 9 Drawing Sheets

LIQUID CRYSTAL DISPLAY WITH HIGH APERTURE RATIO

BACKGROUND OF THE INVENTION

1. Field of the Invention

The present invention relates to a thin-film-transistor liquid-crystal display (TFT-LCD), and more particularly, to a TFT-LCD with a high aperture ratio and with a reduced coupling effect.

2. Description of the Prior Art

Within the popularity of LCDs, display devices from small size to large size usually include TFT-LCDs. However, because the TFT-LCD with smaller size has a smaller displaying region, an aperture ratio of the TFT-LCD with smaller size is lower than the TFT-LCD with larger size in the same resolution so that brightness and contrast of the TFT-LCD with smaller size are reduced. Besides, when the TFT-LCD with a higher resolution is required, the aperture ratio of the TFT-LCD with a higher resolution will also be reduced. Therefore, in order to maintain high brightness in a display, brightness of the backlight should be increased, but cost of the backlight module will be also increased. How to increase the aperture ratio is therefore an important aspect in developing the TFT-LCD.

In the prior art, a poly-silicon TFT-LCD has been already developed. The electron mobility of the poly-silicon is about ten to hundred times higher than the electron mobility of the normally used amorphous silicon, so that the size of the TFT can be reduced so as to have a higher aperture ratio. However, manufacturing methods of the poly-silicon TFT require a manufacturing temperature higher than a temperature of manufacturing an amorphous silicon TFT, and the manufacturing methods of the poly-silicon TFT also require a laser annealing process for transforming the amorphous silicon structure into the poly-silicon structure. Therefore, in the field of cost and yield, the manufacturing methods of the poly-silicon TFT-LCD are not as good as the manufacturing method of the amorphous silicon TFT-LCD.

Referring to FIG. 1 and FIG. 2, FIG. 1 is a schematic diagram illustrating a top view of a pixel structure of TFT-LCD according to a prior art, and FIG. 2 is a schematic diagram illustrating a cross-section along line AA' of FIG. 1. As shown in FIG. 1, a pixel structure 10 of the TFT-LCD includes two scan lines 12 parallel to each other, two data lines 14 perpendicular to the scan lines 12, a TFT 16 disposed at a border between the data line 14 and the scan line 12, a common line 18 disposed between the scan lines 12, and a pixel electrode 20 overlapping a part of the scan lines 12 and the data lines 14, wherein the TFT 16 includes a source electrode 110 and a drain electrode 120. Because the pixel electrode 20 overlaps the scan lines 12 and the data lines 14, coupling capacitances between the pixel electrode 20 and the scan lines 12 are generated, and coupling capacitances between the pixel electrode 20 and the data lines 14 are also generated.

As shown in FIG. 2, the pixel structure 10 further includes an array substrate 22, an organic layer 24, a conductive layer 26, a gate insulating layer 28, and a passivation layer 30. The TFT 16 and the common line 18 are disposed on the array substrate 22. The conductive layer 26 disposed between the gate insulating layer 28 and the passivation layer 30. The organic layer 24 is disposed between the passivation layer 30 and the pixel electrode 20, and the organic layer 24 and the passivation layer 30 both have two through holes 32, 34, so that the pixel electrode 20 can be electrically connected to the drain electrode 110 via the through hole 34 and connected to the conductive layer 26 via the through hole 32. The prior art provides the organic layer 24 and increases the thickness of the organic layer 24 so as to reduce the coupling capacitances between the pixel electrode 20 and the scan lines 12 and the data lines 14, and then, the coupling effect can be reduced. However, in the prior art, the organic layer 24 between the pixel electrode 20 and the passivation layer 30 should also be provided, and the organic layer 24 should have a thickness about 3 micrometers. This means that the manufacturing cost will be increased, and the thickness of the pixel structure 10 of TFT-LCD will also be increased. Therefore, to raise the aperture ratio without increasing manufacturing cost and with reduced coupling effect is an extremely important goal.

SUMMARY OF THE INVENTION

It is therefore a primary object of the claimed invention to provide a TFT-LCD having a high aperture ratio while prevented from being affected by a coupling effect.

According to the claimed invention, a TFT-LCD is provided. The TFT-LCD includes a substrate, a first conductive line formed on the substrate, an inorganic insulating layer covering the substrate, a transparent electrode attached to the inorganic insulating layer, a second conductive line crossing the first conductive line, an inorganic passivation layer covering the substrate and a pixel electrode attached to the inorganic passivation layer. The pixel electrode overlaps the transparent electrode, the first conductive line and the second conductive line, and the transparent electrode is electrically connected to the first conductive line.

The present invention provides a TFT-LCD with a transparent electrode electrically connected to a common line or a scan line. The area of the transparent electrode is increased to raise the storage capacitance, and the thickness of the inorganic passivation layer is increased to enlarge the distance between the transparent electrode and the pixel electrode attached to the inorganic passivation layer. Therefore, the coupling effect generated by the coupling capacitances between the pixel electrode and the scan lines and between the pixel electrode and the data lines can be reduced. The TFT-LCD of the present invention can have a high aperture ratio, and the TFT-LCD cannot be affected by the coupling capacitances between the pixel electrode and the scan lines and between the pixel electrode and the data lines.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
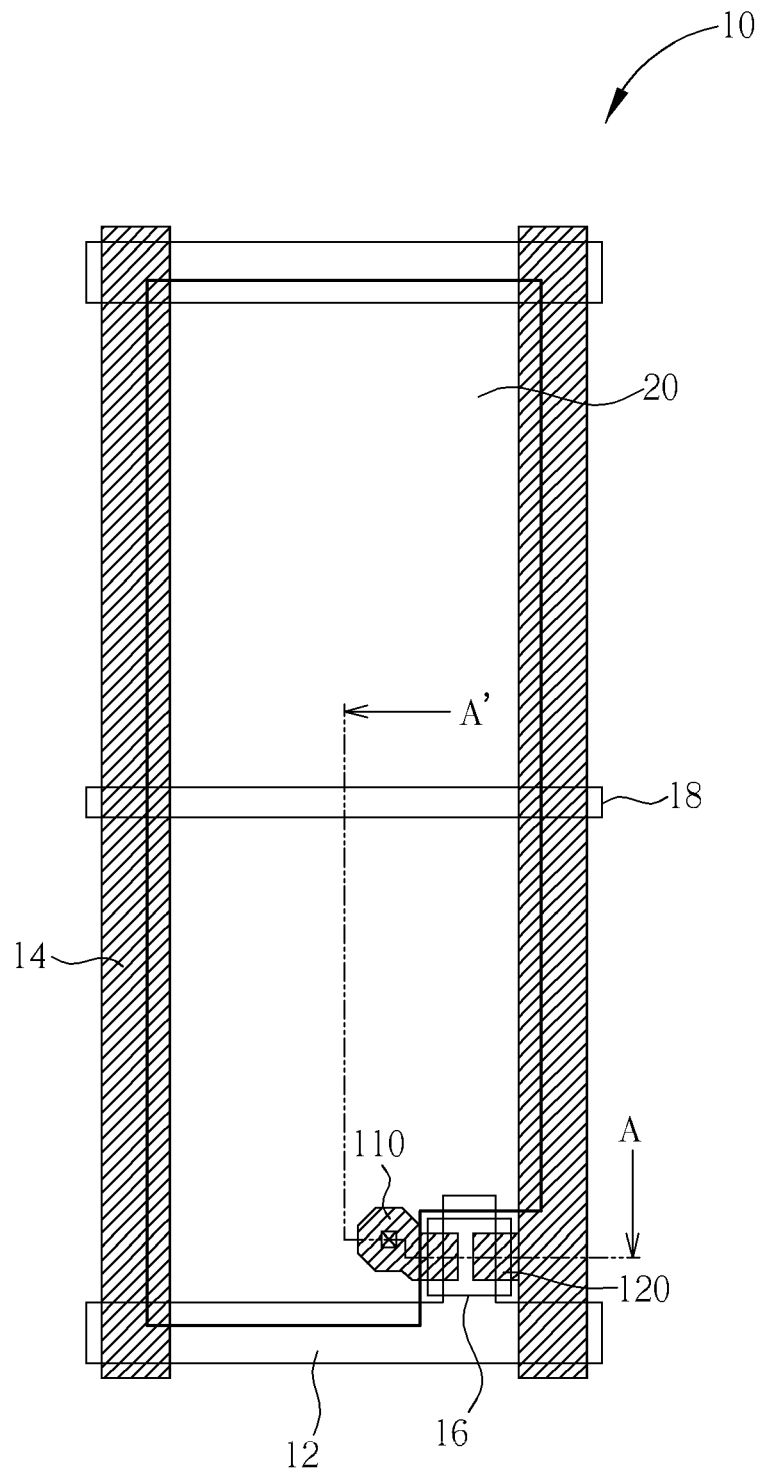
FIG. 1 is a schematic diagram illustrating a top view of a pixel structure of TFT-LCD according to a prior art.
Figure 2:
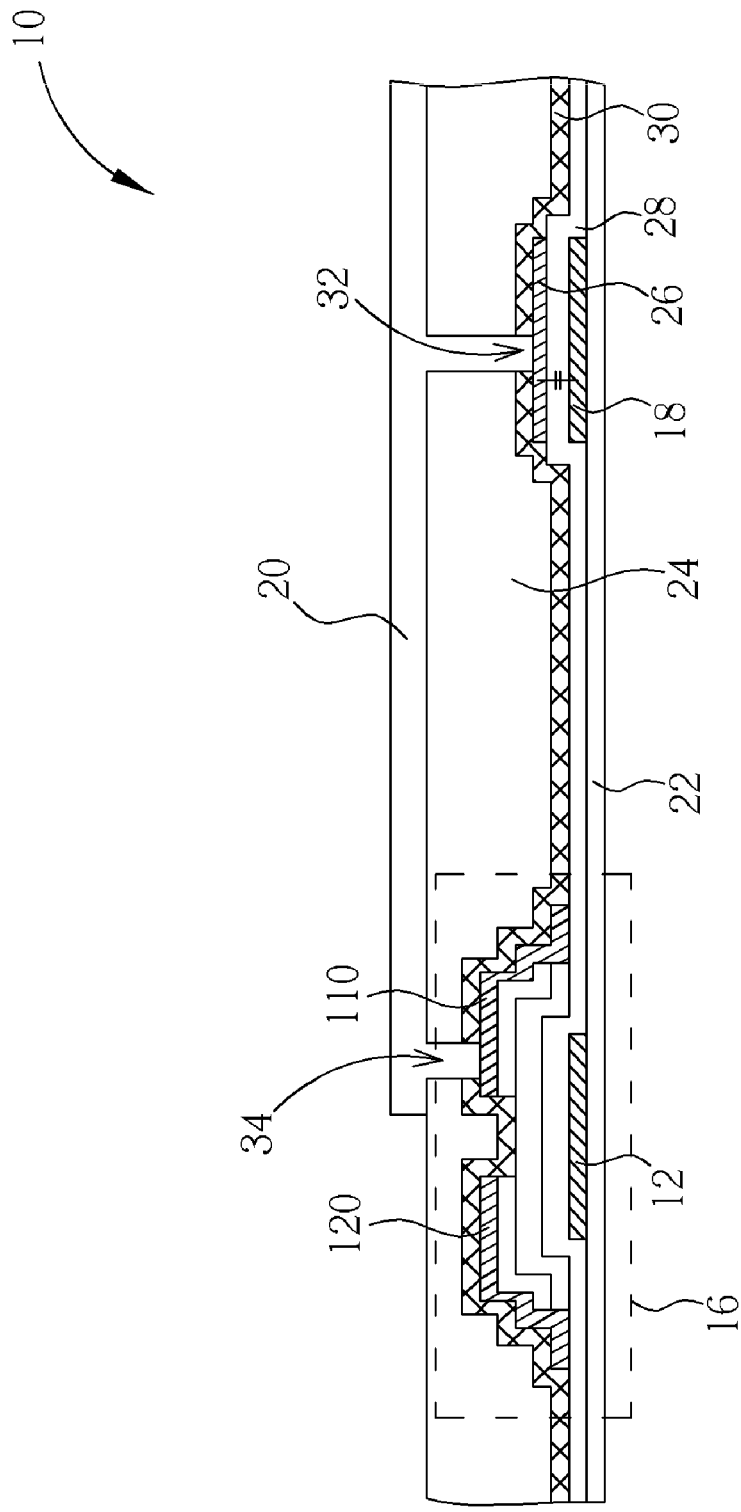
FIG. 2 is a schematic diagram illustrating a cross-section along line AA' of FIG. 1.
Figure 3:
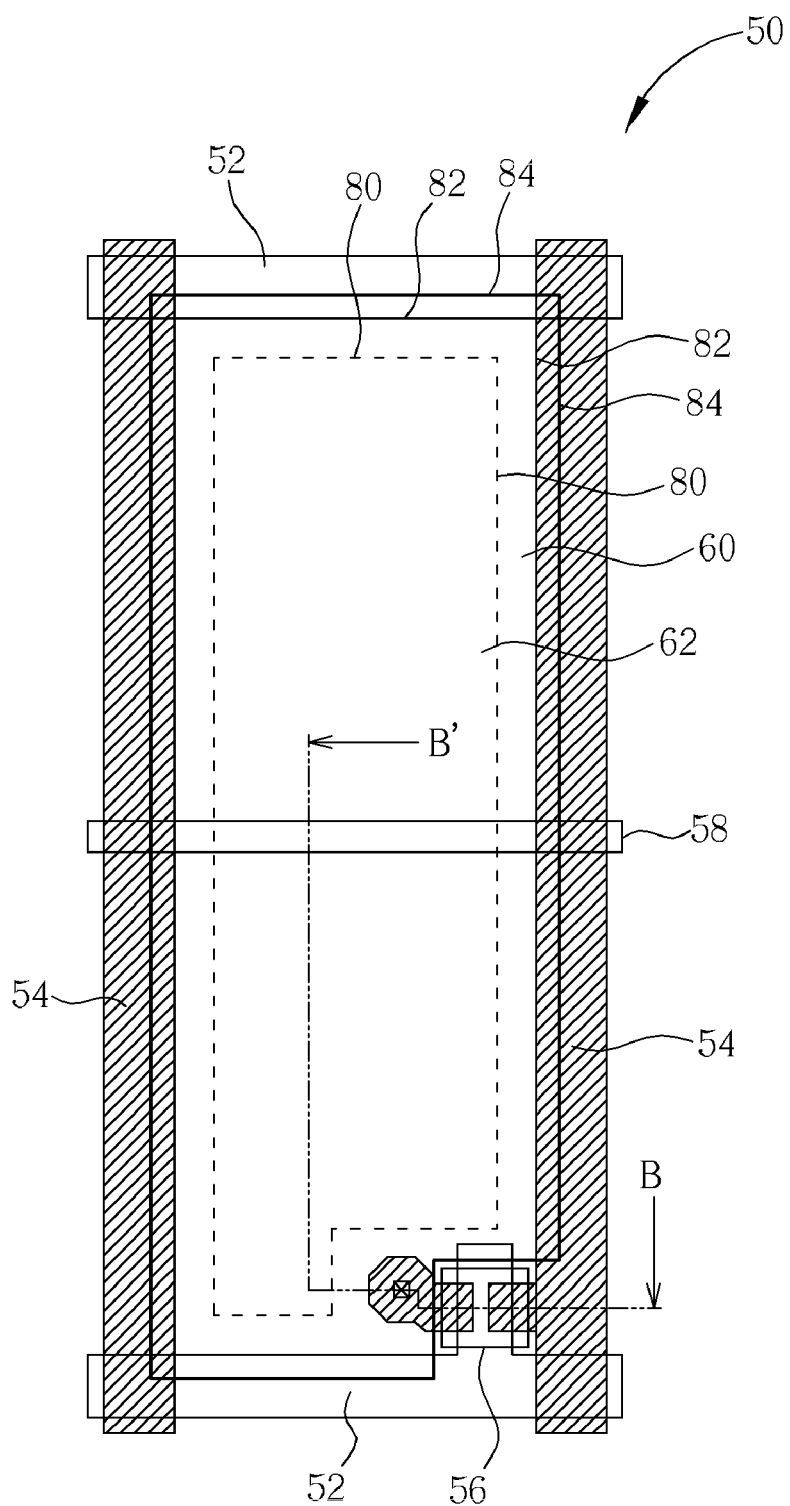
FIG. 3 is a schematic diagram illustrating a top view of pixel structure of a TFT-LCD according to a first preferred embodiment of the present invention.
Figure 4:
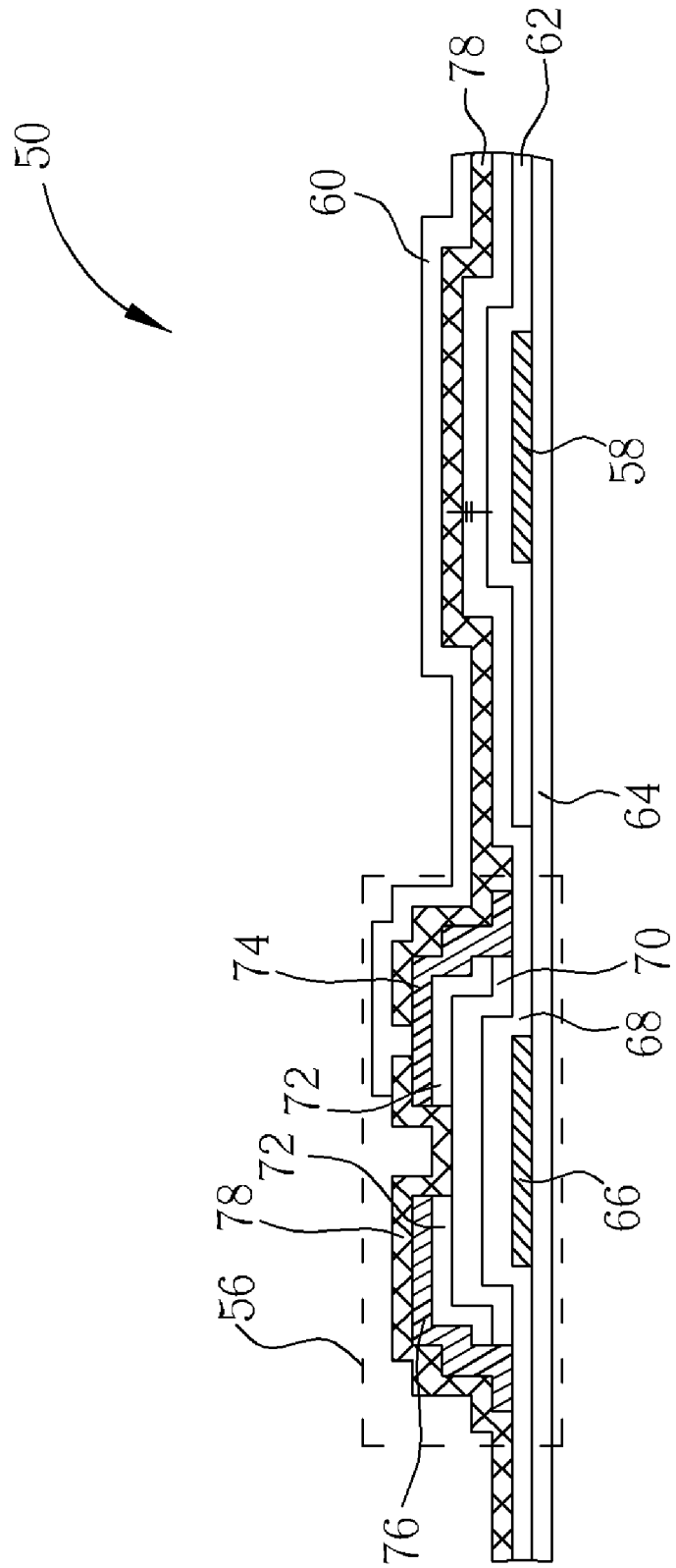
FIG. 4 is a schematic diagram illustrating a cross-section along line BB' of FIG. 3.

Referring to FIG. 3 and FIG. 4, FIG. 3 is a schematic diagram illustrating a top view of a pixel structure of a TFT-LCD according to a first preferred embodiment of the present invention, and FIG. 4 is a schematic diagram illustrating a cross-section along line BB' of FIG. 3. As shown in FIG. 3, a pixel structure 50 of TFT-LCD includes two scan lines 52 parallel to each other, two data lines 54 perpendicular to the scan lines 52, a TFT 56 disposed at a border between the data line 54 and the scan line 52, a common line 58 disposed between the scan lines 52 and substantially parallel to the scan lines 52, a transparent electrode 62, and a pixel electrode 60 partially overlapping the transparent electrode 62, the scan lines 52 and the data lines 54. It should be noted that the condition of the pixel electrode 60 overlapping the scan lines 52 and the data line 54 is not limited to the above-mentioned. The pixel electrode 60 can overlap only the data lines 54 or only the scan lines 52.

As shown in FIG. 4, the common line 58 and the scan lines 52 are generally formed by a same photolithography-etching process (PEP), and the common line 58 and the scan lines 52 are referred to a first metal layer (M1). The data lines 54 are formed after the scan lines 52, and the data lines 54 are referred to a second metal layer (M2). The pixel structure 50 of TFT-LCD further includes a substrate 64, wherein the TFT 56 and the common line 58 are disposed on the substrate 64. The transparent electrode 62 is disposed on the common line 58 and attached to the common line 58; this means that no other material exists between the common line 58 and the transparent electrode 62. In addition, the TFT 56 includes a gate electrode 66 disposed on the substrate 64, an inorganic gate insulating layer 68, an amorphous silicon layer 70 disposed on the inorganic gate insulating layer 68, a doping layer 72 disposed on the amorphous silicon layer 70, a source electrode 74 and a drain electrode 76 disposed on the doping layer 72 and the inorganic gate insulating layer 68, and an inorganic passivation layer 78 covering the substrate 64, wherein the pixel electrode 60 is attached to the inorganic passivation layer 78, and the inorganic passivation layer 78 has a through hole so that the pixel electrode 60 can be electrically connected to the source electrode 74. Also, it should be noted that there is no other organic layer disposed between the pixel electrode 60 and the inorganic passivation layer 78. The thickness of the inorganic passivation layer 78 is substantially between 4500 angstroms and 9000 angstroms. Therefore, the present invention has a simplified structure of the TFT-LCD.

In this embodiment, the material of the inorganic passivation layer 78 can be silicon nitride, silicon oxy-nitride or silicon oxide, a single layer composed thereof or multilayer structure stacked thereby, but the present invention is not limited to this. The materials of both the pixel electrode 60 and the transparent electrode 62 are transparent conductive material, such as indium-tin oxide(ITO), indium-zinc oxide (IZO), aluminum-zinc oxide(AZO) etc., but the present invention is not limited to this. Furthermore, as shown in FIG. 3, the sides of the transparent electrode 62 near the scan lines 52 and data lines 54 have a first edge 80. Both the scan line 52 and the data line 54 have a second edge 82 parallel to the first edge 80. The pixel electrode 60 has a third edge 84 parallel to the second edge 82. In this embodiment, the second edge 82 can be adjacent to the third edge 84 and the first edge 80, and the second edge 82 is between the third edge 84 and the first edge 80. But, the present invention is not limited to this, and the first edge 80 can be between the third edge 84 and the second edge 82. In addition, the relative positions among the first edge 80, the second edge 82 and the third edge 84 also can be adjusted according to the requirements.

Figure 5:
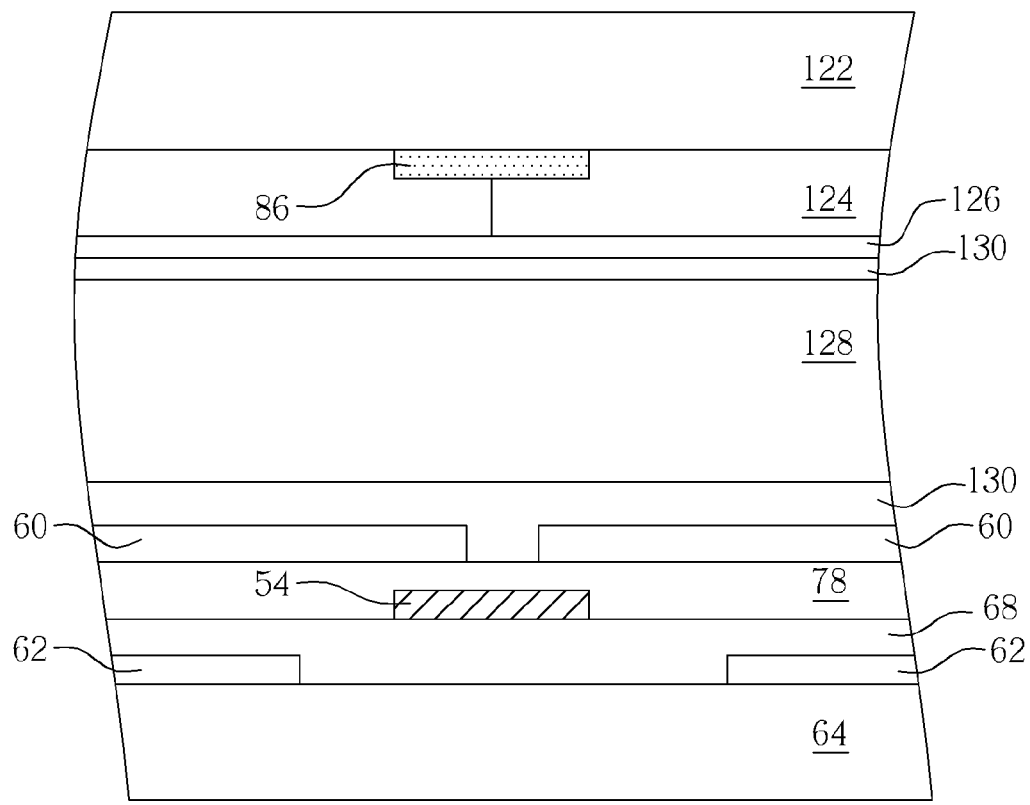
FIG. 5 is a schematic diagram illustrating a cross-section of the data line of the TFT-LCD according to the first preferred embodiment of the present invention.

Referring to FIG. 5, together with FIG. 3 and FIG. 4, FIG. 5 is a schematic diagram illustrating a cross-section of the data line of the TFT-LCD according to the first preferred embodiment of the present invention. As shown in FIG. 5, the TFT-LCD further includes a counter substrate 122 disposed opposite to the substrate 64, a color filter layer 124 disposed on a side of the counter substrate 122 opposite to the substrate 64, a counter electrode 126 disposed on a side of the color filter layer 124 opposite to the substrate 64, a liquid crystal layer 128 disposed between the counter substrate 122 and the substrate 64, two alignment layers 130 disposed on two sides of the liquid crystal layer 128, and a black matrix 86 disposed on a side of the counter substrate opposite to the substrate 64 and disposed corresponding to the data line 54, wherein the pixel electrode 60 overlaps the transparent electrode 62, and a storage capacitance is formed by the pixel electrode 60 overlapping the transparent electrode 62. In addition, the pixel electrode 60 also overlaps the data lines 54, and a part of the pixel electrode 60 overlapping the data lines 54 can be a light-shielding layer because the data lines 54 are composed of opaque materials. Therefore, in this embodiment, the width of the black matrix 86 disposed on the data line 54 between a pixel and an adjacent pixel can be reduced because the data line 54 can be used to be the light-shielding layer. For this reason, the transmittance of a single pixel region that the backlight passes through can be raised, so that the aperture ratio is increased. This embodiment also can be applied to the scan lines 52; that is, the width of the black matrix 86 disposed on the scan line 52 between a pixel and an adjacent pixel also can be reduced. In addition, the pixel electrode 60 overlapping the data line 54 forms a coupling capacitance between the pixel electrode 60 and the data line 54. According to the prior art, the coupling capacitance will generate the coupling effect. The coupling effect is that electric charges in the pixel electrode 60 will be affected by the voltage transferred by the data line 54 before turning into the next displayed image. Therefore, the displayed image will be distorted.

Figure 6:
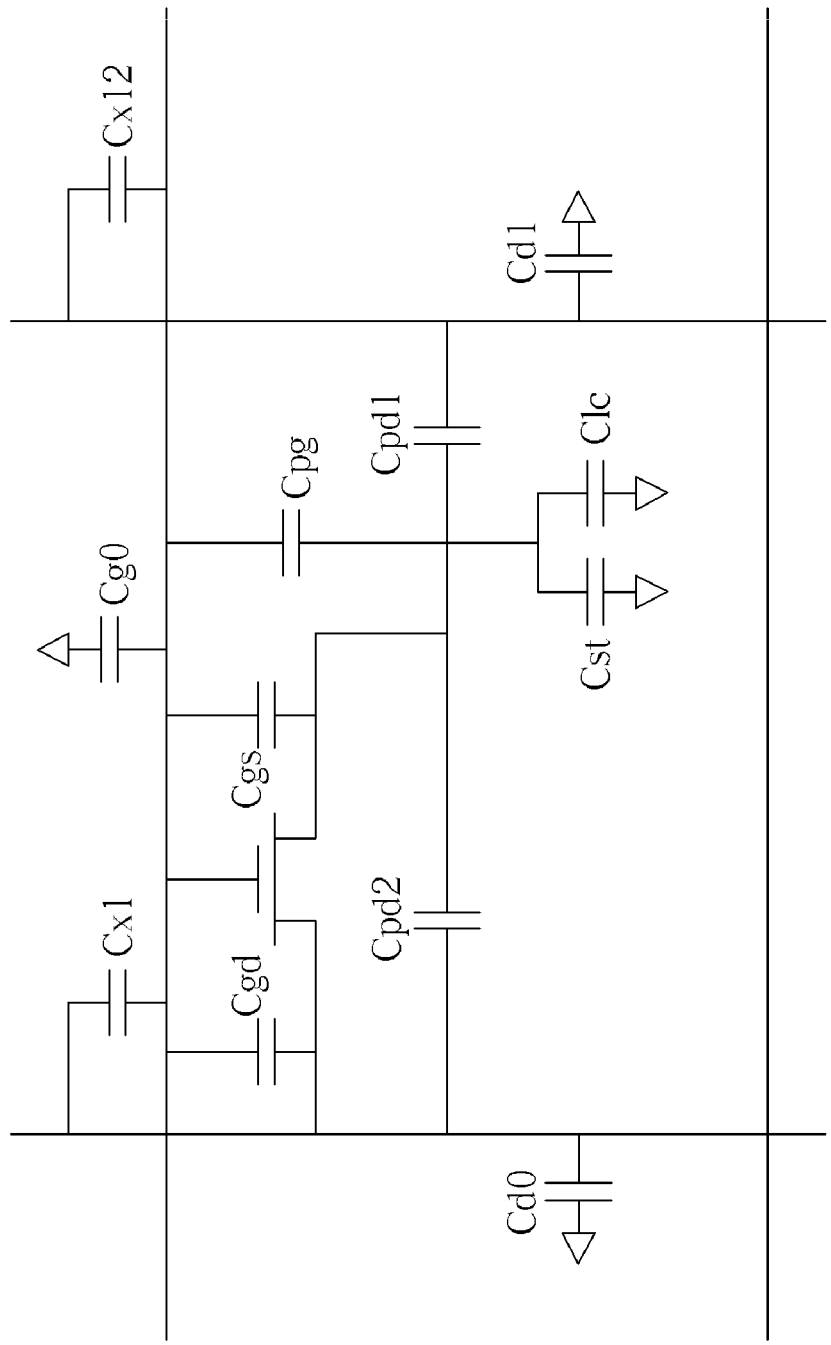
FIG. 6 is a schematic diagram illustrating capacitance-connection circuit of the pixel structure of the TFT-LCD according to the present invention.

In order to increase the aperture ratio and prevent affection by the coupling effect, this embodiment provides a method to reduce the coupling effect and not to affect the aperture ratio. Referring to FIG. 6, FIG. 6 is a schematic diagram illustrating capacitance-connection circuit of the pixel structure of the TFT-LCD according to the present invention. As shown in FIG. 6, a coupling capacitance ratio between the pixel electrode 60 and the data lines 54 in a pixel region is $((C_{pd1}+C_{pd2})/((C_{pd1}+C_{pd2})+C_{st}+C_{lc}+(C_{gs}+C_{pg})))$. $C_{pd1}$ is a coupling capacitance between the pixel electrode 60 and the data line 54 in the same pixel region. $C_{pd2}$ is a coupling capacitance between the pixel electrode 60 and the adjacent data line 54 in an adjacent pixel region. $C_{st}$ is a storage capacitance between the pixel electrode 60 and the transparent electrode 62. $C_{lc}$ is a capacitance of liquid crystal layer 128. $C_{gs}$ is a parasitic capacitance between the gate electrode 66 and the source electrode 74.

According to the above-mentioned formula, compared with the condition of the pixel electrode 60 without overlapping the data lines 54, Cpd1 and Cpd2 in the condition of the pixel electrode 60 overlapping the data lines 54 are larger so that the coupling capacitance ratio in the condition of the pixel electrode 60 overlapping the data lines 54 will also be larger. If the coupling capacitance ratio in the condition of the pixel electrode 60 overlapping the data lines 54 needs to be the same as or smaller than the one in the condition of the pixel electrode 60 without overlapping the data lines 54, Cpd1 and Cpd2 should be reduced. Or, Cst should be increased. In addition, increasing the thickness of the inorganic passivation layer 78 can reduce Cpd1 and Cpd2. However, when the thickness of the inorganic passivation layer 78 is increased, Cst is also reduced at the same time so that the reduction of the coupling capacitance ratio will be more unobvious.

Therefore, this embodiment provides the transparent electrode 62 to be attached to the common line 58, and this embodiment also increases the area of the transparent electrode 62 so as to increase the overlapping area between the pixel electrode 60 and the transparent electrode 62. Cst is hence increased, and the coupling capacitance ratio is the same or smaller than the one in the condition of the pixel electrode 60 without overlapping the data lines 54. Therefore, the coupling effect generated by the coupling capacitance between the pixel electrode 60 and the data lines 54 can be reduced. And, because the transparent electrode 62 and the pixel electrode 60 are composed of the transparent materials, the aperture ratio will not be affected no matter how the area is large. Furthermore, this embodiment also can be applied to the scan lines 52. This means this embodiment also can reduce the coupling capacitance between the pixel electrode 60 and the scan lines 52.

In addition, referring to FIG. 4, besides using the method of increasing the area of the transparent electrode 62, the pixel electrode 60 attached to the surface of the inorganic passivation layer 78 is provided in this embodiment, and the thickness of the inorganic passivation layer 78 is increased between 4500 angstroms and 9000 angstroms. Therefore, the coupling capacitance between the pixel electrode 60 and the data lines 54 and the scan lines 52 also can be reduced so as to reduce the coupling effect.

Figure 7:
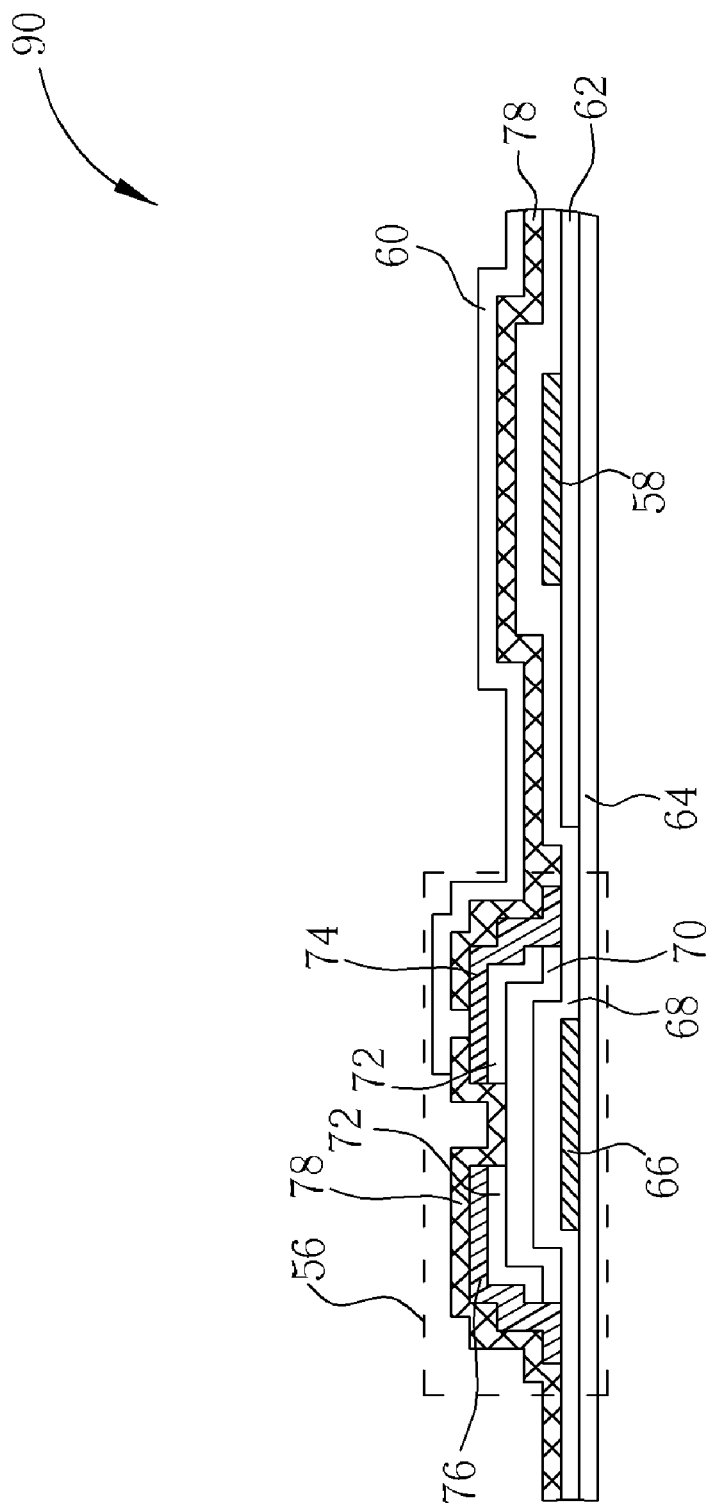
FIG. 7 is a schematic diagram illustrating a cross-section of a pixel structure of the TFT-LCD according to a second preferred embodiment of the present invention.

Referring to FIG. 7, FIG. 7 is a schematic diagram illustrating a cross-section of a pixel structure of the TFT-LCD according to a second preferred embodiment of the present invention. Like elements are denoted by like numerals, and are not detailed redundantly. As shown in FIG. 7, a pixel structure 90 of a TFT-LCD according to this embodiment includes a substrate 64, a TFT 56 disposed on the substrate 64, a transparent electrode 62 disposed on the substrate 64, a common line 58 attached to the transparent electrode 62 and disposed on the transparent electrode 62, and a pixel electrode 60, wherein the TFT 56 includes an inorganic gate insulating layer 68 covering the gate electrode 66 and the substrate 64 and an inorganic passivation layer 78 covering the substrate 64, and the pixel electrode 60 is attached to the inorganic passivation layer 78.

The difference between this embodiment and the above-mentioned embodiment is that the transparent electrode 62 of this embodiment is disposed under the common line 58 and attached to the common line 58. The area of the transparent electrode 62 can also be increased to raise the efficiency of the storage capacitance so that the coupling effect generated by the coupling capacitance between the pixel electrode 60 and the scan lines 52 and the data lines 54 can be reduced. Furthermore, the sides of the transparent electrode 62 near the scan lines 52 and data lines 54 have a first edge 80. Both the scan line 52 and the data line 54 have a second edge 82 parallel to the first edge 80. The pixel electrode 60 has a third edge 84 parallel to the second edge 82. In this embodiment, the second edge 82 can be adjacent to the third edge 84 and the first edge 80, and the second edge 82 is disposed between the third edge 84 and the first edge 80. But, the present invention is not limited to this, and the first edge 80 can be disposed between the third edge 84 and the second edge 82. In addition, the relative positions among the first edge 80, the second edge 82 and the third edge 84 also can be adjusted according to the requirements.

Figure 8:
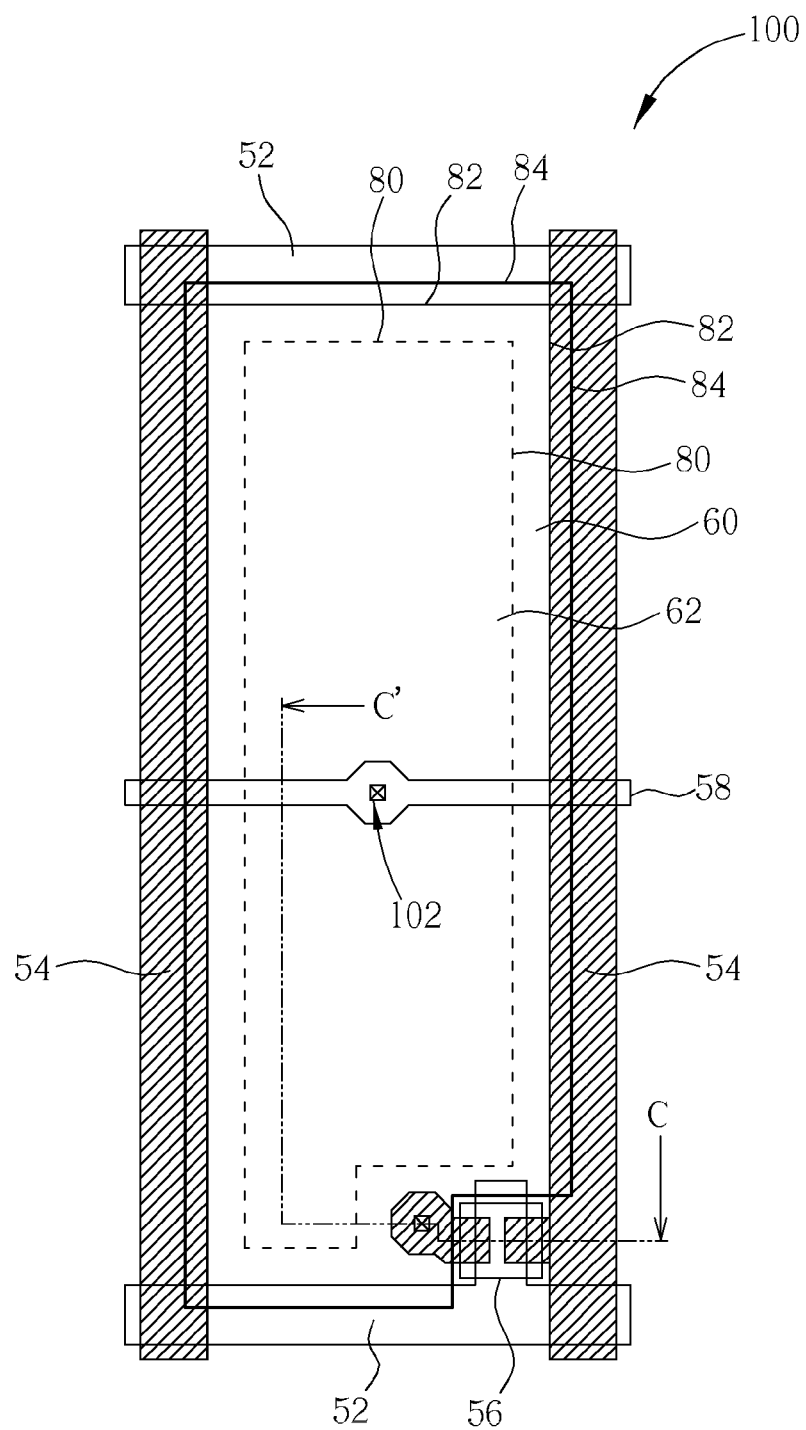
FIG. 8 is a schematic diagram illustrating a top view of the pixel structure of the TFT-LCD according to a third preferred embodiment of the present invention.
Figure 9:
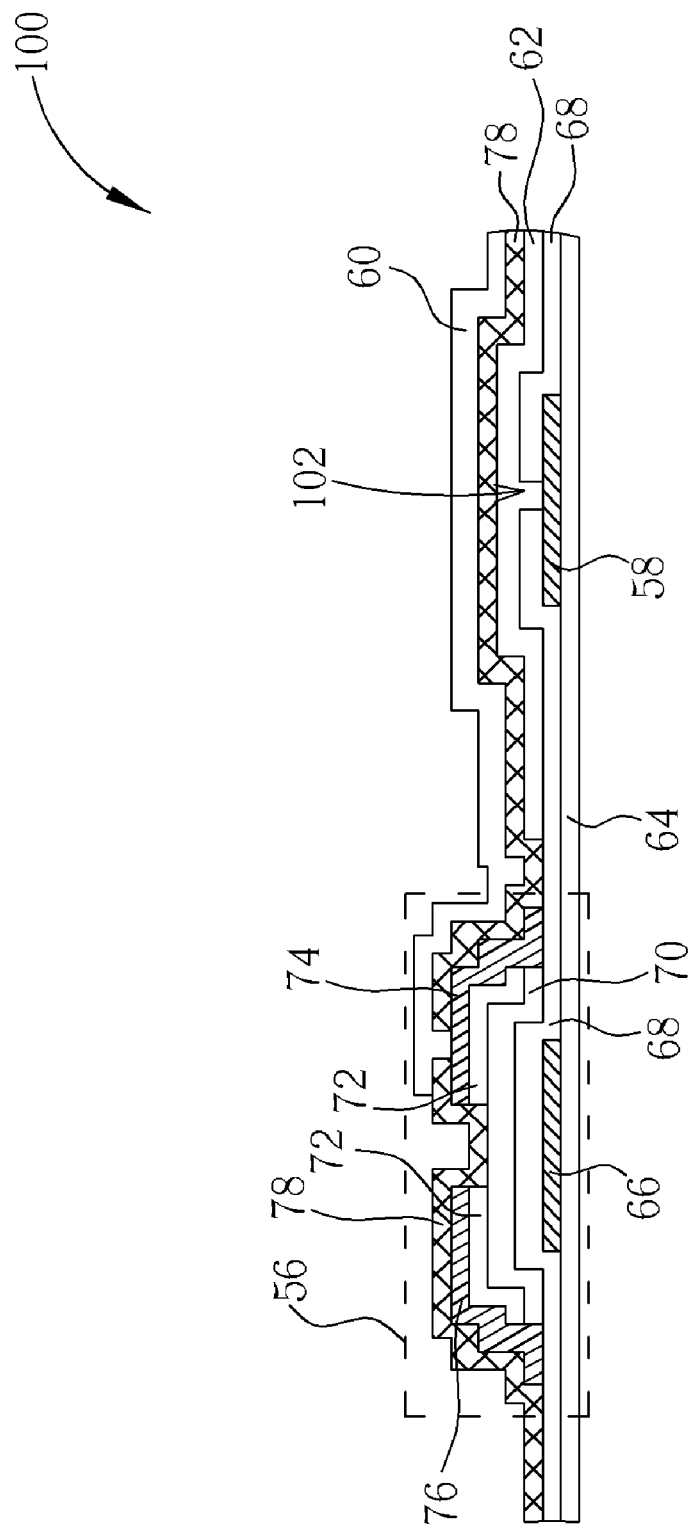
FIG. 9 is a schematic diagram illustrating a cross-section along line CC' of FIG. 8.

Referring to FIG. 8 and FIG. 9, FIG. 8 is a schematic diagram illustrating a top view of the pixel structure of the TFT-LCD according to a third preferred embodiment of the present invention, and FIG. 9 is a schematic diagram illustrating a cross-section along line CC' of FIG. 8. Like elements are denoted by like numerals, and are not detailed redundantly. As shown in FIG. 8 and FIG. 9, a pixel structure 100 of a TFT-LCD according to this embodiment includes a substrate 64, a gate electrode 66 disposed on the substrate 64, a common line 58 disposed on the substrate 64, an inorganic gate insulating layer 68 disposed on the gate electrode 66 and the common line 58, a transparent electrode 62 disposed on the inorganic gate insulating layer 68 and attached to the inorganic gate insulating layer 68, an inorganic passivation layer 78 disposed on the inorganic gate insulating layer 68 and the transparent electrode 62, and a pixel electrode 60 disposed on the inorganic passivation layer 78, wherein the inorganic gate insulating layer 68 has a through hole 102 so that the transparent electrode 62 can be electrically connected to the common line 58 via the through hole 102.

Compared with the above-mentioned embodiments, the pixel structure 100 of this third embodiment reduces the distance between the pixel electrode 60 and the transparent electrode 62 so as to have larger storage capacitance. Therefore, the coupling effect generated by the coupling capacitances between the pixel electrode 60 and the scan lines 52 and between the pixel electrode 60 and the data lines 54 can be effectively reduced. But the present invention not only is applied to the Cst on common type, but also the present invention can be applied to the Cst on gate type. Furthermore, the sides of transparent electrode 62 near the scan lines 52 and data lines 54 have a first edge 80. Both the scan line 52 and the data line 54 have a second edge 82 parallel to the first edge 80. The pixel electrode 60 has a third edge 84 parallel to the second edge 82. In this embodiment, the second edge 82 can be adjacent to the third edge 84 and the first edge 80, and the second edge 82 is disposed between the third edge 84 and the first edge 80. But, the present invention is not limited to this, and the first edge 80 can be disposed between the third edge 84 and the second edge 82. In addition, the relative positions among the first edge 80, the second edge 82 and the third edge 84 also can be adjusted according to the requirements.

In summary, the present invention provides the TFT-LCD with the transparent electrodes attached to the common lines. Also, the area of the transparent electrode is increased so as to raise the storage capacitance, and the thickness of the inorganic passivation layer is increased to enlarge the distance between the pixel electrode and the transparent electrode both attached on the inorganic passivation layer so as to reduce the coupling effect generated by the coupling capacitance. Therefore, the TFT-LCD of the present invention has high aperture ratio, and at the same time, the TFT-LCD of the present invention can be prevented from being affected by the coupling capacitance between the pixel electrode and the data lines and between the pixel electrode and the scan lines.

Those skilled in the art will readily observe that numerous modifications and alterations of the device and method may be made while retaining the teachings of the invention.

What is claimed is:

1. A liquid crystal display, comprising:
   a substrate;
   a first conductive line formed on the substrate;
   an inorganic insulating layer covering the substrate;
   a transparent electrode attached to the inorganic insulating layer, the transparent electrode electrically connected to the first conductive line;
   a second conductive line crossing the first conductive line;
   an inorganic passivation layer covering the substrate; and
   a pixel electrode attached to the inorganic passivation layer, and the pixel electrode overlapping the transparent electrode, the first conductive line, and the second conductive line.

2. The liquid crystal display of claim 1, wherein the second conductive line is a scan line or a data line.

3. The liquid crystal display of claim 1, wherein the transparent electrode has a first edge, the second conductive line has a second edge parallel to the first edge, and the pixel electrode has a third edge parallel to the second edge.

4. The liquid crystal display of claim 3, wherein the second edge is adjacent to the third edge and the first edge.

5. The liquid crystal display of claim 3, wherein the second edge is between the third edge and the first edge.

6. The liquid crystal display of claim 1, wherein the first conductive line is a common line or a scan line.

7. The liquid crystal display of claim 6, wherein the transparent electrode disposed between the pixel electrode and the inorganic insulating layer, and the inorganic insulating layer has a through hole.

8. The liquid crystal display of claim 7, wherein the transparent electrode is connected to the common line via the through hole.

9. The liquid crystal display of claim 1, wherein the inorganic passivation layer has a thickness between 4,500 angstroms and 9,000 angstroms.

10. The liquid crystal display of claim 1, wherein the inorganic passivation layer is disposed between the pixel electrode and the transparent electrode.

11. The liquid crystal display of claim 1, wherein the inorganic insulating layer is disposed between the pixel electrode and the transparent electrode.

12. The liquid crystal display of claim 1, wherein the transparent electrode and the first conductive line are disposed under the inorganic insulating layer.

* * * * *